United States Patent [19]
Bassand

[11] 3,726,975
[45] Apr. 10, 1973

[54] SYNERGISTIC INSECTICIDAL COMPOSITIONS OF O,O-DIMETHYL-S-(N-METHYL-CARBAMOYLMETHYL)-THIOL-THIONOPHOSPHATE AND AN O,O-DIALKYL-DITHIOPHOSPHORYL-ACETIC ACID DERIVATIVE

[75] Inventor: Denis Bassand, Binningen, Switzerland

[73] Assignee: Sandoz Ltd., (also known as Sandoz AG), Basel, Switzerland

[22] Filed: Aug. 19, 1971

[21] Appl. No.: 173,241

Related U.S. Application Data

[63] Continuation-in-part of Ser. Nos. 786,382, Dec. 23, 1968, abandoned, and Ser. No. 23,075, March 26, 1970, abandoned.

[30] Foreign Application Priority Data

Jan. 4, 1968    Switzerland ............................. 85/68
Apr. 3, 1969    Switzerland ......................... 5159/69

[52] U.S. Cl. ............................... 424/211, 424/212
[51] Int. Cl. ........................... A01n 9/02, A01n 9/36
[58] Field of Search ............... 424/211, 212, DIG. 8; 260/941, 943

[56] References Cited

UNITED STATES PATENTS 3,047,459    7/1962    Perini et al. .......................... 424/212

FOREIGN PATENTS OR APPLICATIONS

37/25113    11/1964    Japan
1,060,659    11/1957    Germany

*Primary Examiner*—Albert T. Meyers
*Assistant Examiner*—Allen J. Robinson
*Attorney*—Gerald D. Sharkin et al.

[57] ABSTRACT

Insecticidal compositions comprising O,O-dimethyl-S-(N-methyl-carbamoylmethyl)-thiol-thionophosphate and an O,O-dialkyl-dithiophosphoryl-acetic acid or a lower alkyl ester thereof.

8 Claims, No Drawings

SYNERGISTIC INSECTICIDAL COMPOSITIONS OF O,O-DIMETHYL-S-(N-METHYL-CARBAMOYLMETHYL)-THIOL-THIONOPHOSPHATE AND AN O,O-DIALKYL-DITHIOPHOSPHORYL-ACETIC ACID DERIVATIVE

This is a continuation-in-part of our copending applications Ser. No. 786,382 filed on Dec. 23, 1968 and Ser. No. 23,075 filed on Mar. 26, 1970, and both now abandoned, and relates to insecticidal compositions.

According to our invention we provide an insecticidal composition comprising as active agent a mixture of from one to five parts by weight of O,O-dimethyl-S-(N-methyl-carbamoylmethyl)-thiol-thionophosphate of formula I,

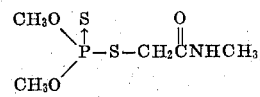
                              I and from one to 20 parts by weight of a dithiophosphoryl-acetic acid derivative of formula II,

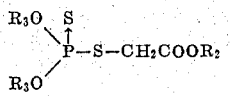
                              II in which $R_2$ is hydrogen or alkyl of one to three carbon atoms, and $R_3$ is alkyl of one to four carbon atoms, in association with an insecticidal carrier.

It is to be understood that the term "insect" includes not only the members of the class Insecta, but also related or similar non-vertebrate animal organisms belonging to the allied classes of anthropods and including mites, ticks, spiders and the like.

The compounds of formula II are known compounds or may be made by methods analogous to the methods known for making the known compounds.

Mixtures containing O,O-dimethyl-S-(N-methyl-carbamoyl-methyl)-thiol-thonophosphate of formula I and a compound of general formula II in a ratio of 5 : 1 to 1 : 20, especially 2 : 1 to 1 : 20, by weight, show a good effect against insects. A mixture of the compound of formula I with a compound of general formula II in a ratio of between 2 : 1 and 1 : 10 by weight, especially 1 : 2 by weight has proved to be particularly suitable. O,O-dimethyl-dithiophosphoryl-acetic acid is preferably used as the compound of general formula II.

The insecticidal compositions of our invention are suitable for use in plant protection and may be used in the same manner and for the same purposes as O,O-dimethyl-S-(N-methyl-carbamoylmethyl)-thiol-thionophosphate, such as for protecting plant cultures e.g. in combating insects in fruit and vegetable cultures and in combating destructive insects in cotton plantations.

The use of O,O-dimethyl-S-(N-methyl-carbamoyl-methyl)-thiol-thionophosphate as a systemic insecticide, e.g. against spider mites, has been known for a long time. The compounds of general formula II, however, when used alone have no, or minimal, insecticidal effect. It is therefore particularly surprising that the effect of the mixtures in accordance with the invention, against insects considerably surpasses the effect of an equivalent weight of O,O-dimethyl-S-(N-methyl-carbamoylmethyl)-thiol-thionophosphate when used alone.

By the use of the mixtures according to our invention, as compared with the active agent O,O-dimethyl-S-(N-methyl-carbamoylmethyl)-thiol-thionophosphate when used alone, it is possible to reduce considerably the amount of active agent which is necessary for the complete destruction of insects. Thus an advantage of our present invention is that the absolute quantity of the active ingredient necessary to produce the required effect is reduced and in consequence the danger of toxic side effects is likewise reduced.

The formulation and the application of our compositions may be carried out in ways well known in the art for the formulation and application of similar insecticides. Suitable formulations include concentrates, dusts and sprays, e.g. solutions or dispersions in agriculturally acceptable liquids conventionally used for such purposes, for example water or a suitable organic solvent, e.g. ethyl alcohol, petroleum, tar distillates, etc., together with an emulsifier, e.g. a liquid polyglycol ether, derived from a high-molecular weight alcohol, mercaptan or alkylphenol and an alkylene oxide. Suitable organic solvents, for example ketones (e.g. methylethyl ketone), aromatic or optionally halogenated hydrocarbons (e.g. xylene, its analogues, chlorobenzene and white spirits), mineral oils, etc., may also be incorporated in the mixture as solution aids.

The spraying and dusting agents may contain the usual and conventional agriculturally acceptable inert carrier materials, e.g. talc, diatomaceous earth, bentonite, pumice or other additives, such as cellulose derivatives and the usual and conventional adhesives and wetting agents.

Formulations suitable for normal or low volume spraying may contain from about 0.03 percent to about 10 percent by weight of the compound formula I and should preferably not contain more than about 20 percent by weight thereof of the combined compounds of formulae I and II. Formulations suitable for ultra low volume spraying may contain up to 50 percent by weight thereof of the combined compounds of formulae I and II.

The invention is illustrated, but in no way limited by the following Examples, in which the parts and percentages are by weight unless otherwise stated.

EXAMPLE 1

Effect against Aphis fabae.

Wingless imagos aand larvae of Aphis fabae (black bean aphid) were used for the test.

This test is based on the ability of the aphid to suck up through a membrane consisting of a mixture of latex and paraffin, a 20 percent aqueous solution of cane sugar used as nutrient solution.

The aphids are counted into containers consisting of hollow "Plexiglas" cylinders having a diameter and height of 2.5 cm, which are closed on one side with nylon gauze and on the other with a stretched double membrane consisting of latex and paraffin. One drop of nutrient solution which contains the indicated amount of the substance to be tested, is introduced between the two membranes. The mixture to be tested, dissolved in (0.1 percent aqueous) acetone, is added to the nutrient solution. The content of 0,0-dimethyl-S-(N-methyl-carbamoylmethyl)-thiolpthionophosphate and/or the compound of formula II in the solution is indicated in Table 1.

Five aphids (imagos) are placed in each container, and five repetitions are effected for each test or concentration. The test set-up is maintained at normal room temperature. The same test is effected with a nutrient solution containing a corresponding amount of acetone and without the active agent or the compound of formula II, for purposes of control.

Two days after the treatment the living and dead aphids in each container are counted out. Mortality is indicated as a precentage. The evaluation of the test is effected in accordance with W.S.Abbott, "A method of computing the effectiveness of an insecticide," J.Econ.Entomol. 18, pages 265–267 (1925).

The results of the test are summarized in the following Table 1. In this Table compound I is 0,0-dimethyl-S-(N-methyl-carbamoylmethyl)-thiol-thionophosphate and the compound of formula II is 0,0-dimethyl-dithiophosphoryl-acetic acid.

It may be seen from the results of the test that the combination of 0,0-dimethyl-S-(N-methyl-carbamoylmethyl)-thiol-thionophosphate with the compound of formula II considerably increases the effectiveness of the insecticide, thus showing the synergistic effect of the additive.

TABLE 1

| Content in the nutrient solution of: | | |
|---|---|---|
| Compound I (ppm) | Compound II (ppm) | Mortality in % after 2 days |
| 1 | - | 48 |
| - | 8 | 1 |
| - | 2 | 6 |
| - | 0.5 | 4 |
| 1 | 8 | 67 |
| 1 | 2 | 83 |
| 1 | 0.5 | 76 |
| Control | | 5 |

EXAMPLE 2

Effect against Aphis fabae

The test employed in Example 1 was repeated using 0,0-diethyl, di-n-propyl, and di-n-butyl dithiophosphoryl-acetic acids as the compound of Formula II. It is to be understood that the tests for each insecticidal composition containing the synergistic mixture were effected on different occasions and on different batches of aphis fabae. For this reason, a control was effected on the compound of formula I under the same conditions and on the same batch of insects as each test effected. The results are set out in Table 2 below:

TABLE 2

| Content in the nutrient solution of | | Mortality in % after 2 days |
|---|---|---|
| Compound I p.p.m. | Compound II p.p.m. | |
| | 0,0-diethyl dithiophosphoryl acetic acid | |
| 1 | — | 59 |
| — | 2 | 4 |
| 1 | 2 | 75 |
| | 0,0-di-n-propyl dithiophosphoryl acetic acid. | |
| 1 | — | 49 |
| — | 2 | 4 |
| 1 | 2 | 71 |
| | 0,0-di-n-butyl dithiophosphoryl acetic acid | |
| 1 | — | 36 |
| — | 2 | 3 |
| 1 | 2 | 57 |

EXAMPLE 3

Insecticidal contact effect against Tribolium confusum.

Imagos of Tribolium confusum (American rice meal beetles) were used for the test.

A filter paper having an adequate size is placed in dishes having a diameter of 9.5 cm and is soaked with 3 ml of insecticidal liquor, produced from the compositions indicated in Table 3. The liquor concentrations are indicated in Table 3, columns 5 and 6. The formulation is subsequently allowed to dry at room temperature over night.

Thirty live imagos are placed on the dry paper in each dish and this is covered with a lid of fine mesh brass wire gauze. The insects are kept without food.

The dishes are kept in the dark in a thermostat at 25°C. A shallow dish with water is placed on the bottom of the thermostat.

The measurements are made 2 and 3 days after placing the insects in the dish. The dead insects are counted and mortality is indicated as a percentage.

The results of the test are summarized in Table 3. In this Table the compound I is 0,0-dimethyl-S-(N-methyl-carbamoyl-methyl)-thiol-thionophosphate, and the compound II is 0,0-dimethyl-dithiophosphoryl-acetic acid.

It may be seen from the results of the tests that the active agent 0,0-dimethyl-S-(N-methyl-carbamoylmethyl)-thiol-thiono-phosphate alone, at the indicated concentration, does not have a significant insecticidal effect. The compound II alone also does not show any insecticidal effect. Surprisingly, however, the effectiveness of the insecticide 0,0-dimethyl-S-(N-methyl-carbamoylmethyl)-thiol-thionophosphate is considerably increased by combination with the compound of general formula II, so that the synergistic effect is clearly established.

TABLE 3

| Composition in percent | | | | Content in liquor of— | | Effect against *Tribolium confusum*, mortality in percent after— | |
|---|---|---|---|---|---|---|---|
| Compound I | Alkylphenyl-polyglycol ether | Compound II | Acetone | Compound I (p.p.m.) | Compound II (p.p.m.) | 2 days | 3 days |
| | 25 | 25 | 50 | 1,000 | | 0 | 3 |
| | 25 | 25 | 50 | | 4,000 | 0 | 0 |
| | 25 | 25 | 50 | | 2,000 | 0 | 0 |
| | 25 | 25 | 50 | | 1,000 | 0 | 0 |
| | 25 | 25 | 50 | | 500 | 0 | 0 |
| 5 | 25 | 20 | 50 | 1,000 | 4,000 | 50 | 83 |
| 10 | 25 | 20 | 45 | 1,000 | 2,000 | 87 | 100 |
| 10 | 25 | 10 | 55 | 1,000 | 1,000 | 56 | 96 |
| 20 | 25 | 10 | 45 | 1,000 | 500 | 0 | 43 |
| Control | | | | | | 0 | 0 |

EXAMPLE 4

Effect against Aphis fabae

Wingless imagos and larvae of Aphis fabae (black bean aphid) were used for the test.

Branches of horsebeans are cut in such a manner that their average length amounts to 15 cm. Immediately thereafter the branches are dipped into 100 ml Erlenmeyer flasks containing the liquors indicated in Tables 4 and 5.

One day later small cages, containing the aphids, are attached to the under side of the leaves. These cages consist of hollow "Plexiglas" cylinders having a diameter and height of 1 cm, which are closed on one end by nylon gauze, the other open end being fixed to the leaves. 5 aphids are counted into each cage. Two cages are fixed on each branch and two branches are used for each concentration.

Measurement of the insecticidal effect: 1 day after fixing the cages the living and dead aphids are counted out. Mortality is indicated as a percentage in accordance with Abbott, "A method of computing the effectiveness of an insecticide," J.Econ.Entomol. 18, pages 265–267 (1925).

The results of the test are indicated in Tables 4 and 5. In these Tables the compound I is 0,0-dimethyl-S-(N-methyl-carbamoylmethyl)-thiol-thionophosphate, the compound IIa is 0,0-dimethyl-dithiophosphoryl-acetic acid and the compound IIb is 0,0-dimethyl-dithiophosphoryl-acetic acid ethyl ester.

height of about 15 cm, in the two-leaf stage and planted in 8 cm diameter pots (3 plants per pot) are sprayed with the synergistic mixture indicated in Table 6 or with the insecticidal phosphoric ester alone for comparison. The liquor concentration is indicated in Table 6. As soon as the layer of active agent sprayed on the plants is dry, small cages, containing the aphids, are attached to the under side of the leaves. These cages consist of hollow "Plexiglas" cylinders having a diameter and height of 1 cm, which are closed on one end by nylon gauze, the other open end being in touch with the leaves. The hollow cylinders are attached to the leaves. Five aphids are counted into each cage. Two cages are used for each pot. The test is repeated five times. During the test period the plants are kept at room temperature under artifical light.

Two days after treatment the live and dead insects in each cage are counted out. Mortality is indicated as a percentage. Evaluation is effected in accordance with W. S. Abbott, A method of computing the effectiveness of an insecticide, J. Econ. Entomol. 18 [1925] pages 265–267.

The results of the tests are summarized in the following Table 6. In this Table the synergistic agent is the compound of formula II, in which $R_3$ is the n-propyl radical, and $R_2$ is hydrogen.

It may be seen from the results of the tests that the compound of formula II alone does not show an insec-

TABLE 4

| Composition in percent | | | | Content in liquor of— | | Effect against Aphis fabae, mortality in percent after 1 day |
|---|---|---|---|---|---|---|
| Compound I | Alkyl-phenyl-polyglycol ether | Compound IIb | Acetone | Compound I (p.p.m.) | Compound IIb (p.p.m.) | |
| 25 | 25 | | 50 | 1 | | 46 |
| 25 | 25 | | 50 | 0.5 | | 36 |
| 25 | 25 | | 50 | 0.25 | | 16 |
| | 25 | 25 | 50 | | 2 | 1 |
| | 25 | 25 | 50 | | 1 | 2 |
| | 25 | 25 | 50 | | 0.5 | 2 |
| 10 | 25 | 20 | 45 | 1 | 2 | 77 |
| 10 | 25 | 20 | 45 | 0.5 | 1 | 42 |
| 10 | 25 | 20 | 45 | 0.25 | 0.5 | 38 |
| Control | | | | | | 3 |

TABLE 5

| Composition in percent | | | | Content in liquor of— | | Effect against Aphis fabae, mortality in percent after 1 day |
|---|---|---|---|---|---|---|
| Compound I | Alkyl-phenyl-polyglycol ether | Compound IIb | Acetone | Compound I (p.p.m.) | Compound IIb (p.p.m.) | |
| 25 | 25 | | 50 | 1 | | 46 |
| 25 | 25 | | 50 | 0.5 | | 36 |
| 25 | 25 | | 50 | 0.25 | | 16 |
| | 25 | 25 | 50 | | 2 | 1 |
| | 25 | 25 | 50 | | 1 | 2 |
| | 25 | 25 | 50 | | 0.5 | 0 |
| 10 | 25 | 20 | 45 | 1 | 2 | 76 |
| 10 | 25 | 20 | 45 | 0.5 | 1 | 89 |
| 10 | 25 | 20 | 45 | 0.25 | 0.5 | 53 |
| Control | | | | | | 3 |

EXAMPLE 5

Insecticidal contact effect against Aphis fabae (black bean aphid)

Adults and larvae of Aphis fabae (black bean aphid) were used for the test. Climbing bean plants, having a ticidal effect. In combination with an insecticidally effective phosphoric acid ester of formula I, however, the effect of the insecticidal phosphoric acid ester is increased considerably, this illustrating the synergistic effect of compound of formula II.

TABLE 6

| Content in spraying liquor of: | | Mortality in % after 2 days |
|---|---|---|
| COMPOUND I | COMPOUND II | |
| 1 ppm | — | 45 |
| 1 ppm | 20 ppm | 70 |
| CONTROL | | |
| No addition of an insecticidal phosphoric acid ester | 20 ppm | 2 |

EXAMPLE 6

Insecticidal effect against Rhagoletis cerasi (cherry fly)

Natural populations of the cherry fly were used for the test. Cherry-trees are treated as follows: One half of each tree is sprayed up to the "run-off," the other half not being treated for the normal control. At harvest-time the infested cherries are counted out. Mortality is indicated as a percentage in accordance with W.S. Abott (see following Table 7). In this example the compound of formula II is 0,0-dimethyl-dithiophosphoryl-acetic acid.

TABLE 7

| Content in spraying liquor of: | | Rel. effect in % in accordance with Abbott |
|---|---|---|
| COMPOUND I | COMPOUND II | |
| 25 ppm | — | 62.4 |
| 25 ppm | 500 ppm | 100.0 |
| 50 ppm | — | 71.4 |
| 50 ppm | 500 ppm | 100.0 |
| 100 ppm | — | 42.8 |
| 100 ppm | 500 ppm | 100.0 |
| 25 ppm | — | 62.4 |
| 25 ppm | 250 ppm | 100.0 |
| 50 ppm | — | 71.4 |
| 50 ppm | 250 ppm | 100.0 |
| 100 ppm | — | 42.8 |
| 100 ppm | 250 ppm | 80.0 |

Synergistic effects similar to those hereinbefore described in Examples 1 to 6 with reference to Tables 1 to 7, are obtained with compositions including as the compound of formula II 0,0-dimethyl-dithiophosphorylacetic acid methyl ester, 0,0 diethyl dithiophosphorylacetic acid n- propyl ester, and 0,0-di-n-butyl-dithiophosphorylacetic acid isopropyl ester.

Apart from the liquors used in Examples 1 to 7, other compositions may also be used, e.g.:

EXAMPLE 7

Twenty parts by weight of 0,0-dimethyl-S-(N-methyl-carbamoylmethyl)-thiol-thionophosphate are mixed with 20 parts by weight of 0,0-dimethyl-dithiophosphoryl-acetic acid, 20 parts weight of isooctyl-phenyl-decaglycol ether and 40 parts by weight of xylene. A clear solution is obtained, which may be readily stirred into water to form a finely dispersed emulsion containing from about 0.03 percent to about 2 percent of 0,0-dimethyl-S-(N-methyl-carbamoyl-methyl)-thiol-thionophosphate. Chlorobenzene or a mixture of chlorobenzene and xylene may, for example be used in place of xylene.

EXAMPLE 8

Thirty parts by weight of 0,0-dimethyl-S-(N-methyl-carbamoyl-methyl)-thiol-thionophosphate, 15 parts by weight of 0,0-dimethyl-dithiophosphoryl-acetic acid, 15 parts by weight of isooctyl-phenyl-decaglycol ether and 40 parts by weight of xylene are mixed, whereby a clear solution is obtained, which may be readily stirred into water to form a finely dispersed emulsion.

EXAMPLE 9

Twenty parts by weight of 0,0-dimethyl-S-(N-methyl-carbamoyl-methyl)-thiol-thionophosphate, 20 parts by weight of 0,0-dimethyl-dithiophosphoryl-acetic acid ethyl ester, 20 parts by weight of isooctyl-phenyl-octaglycol ether and 40 parts by weight of xylene are mixed, whereby a clear solution results, which has a good emulsifying power in water.

What is claimed is:

1. An insecticidal composition comprising an insecticidal amount of a mixture of from one to two parts by weight of 0,0-dimethyl-S-(N-methyl-carbamoyl-methyl)-thiol-thionophosphate and from one to 20 parts by weight of a dithiophosphoryl-acetic acid derivative of the formula

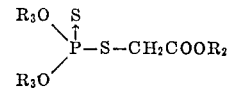

in which $R_2$ is hydrogen or alkyl of from one to three carbon atoms and $R_3$ is alkyl of one to four carbon atoms, and an insecticidal carrier.

2. The composition of claim 1, in which $R_2$ is ethyl and each $R_3$ is methyl.

3. The composition of claim 1, in which $R_2$ is hydrogen

4. The composition of claim 3, in which each $R_3$ is methyl.

5. The composition of claim 3, in which each $R_3$ is n-propyl.

6. The composition of claim 1 in which the weight ratio of the thiol-thionophosphate to dithiophosphoryl-acetic acid derivative is from 2:1 to 1:10.

7. The composition of claim 6, in which $R_2$ is hydrogen and each $R_3$ is methyl.

8. The composition of claim 6, in which $R_2$ is hydrogen and each $R_3$ is n-propyl.

* * * * *